United States Patent [19]
Kohler et al.

[11] 3,787,129
[45] Jan. 22, 1974

[54] UNIVERSAL JOINT BALL MOUNTING CONSTRUCTION

[75] Inventors: Alfred Kohler, Bietigheim/Wurttemberg; Kurt Bauer, Kleiningersheim/Wurttemberg, both of Germany

[73] Assignee: SWF Spezialfabrik fur Antozubehor Gustav Raw GmbH, Bietigheim/Wurttemberg, Germany

[22] Filed: Mar. 22, 1972

[21] Appl. No.: 237,109

[30] Foreign Application Priority Data
Apr. 3, 1971   Germany.................. P 21 16 463.6

[52] U.S. Cl. ........................................... 403/135
[51] Int. Cl. ............................................ F16c 11/06
[58] Field of Search .......................... 287/87, 90, 21

[56] References Cited
UNITED STATES PATENTS
3,704,903   12/1972   Ito................................. 287/90 R
3,530,495   9/1970   Kindel............................. 287/87
3,506,290   4/1970   Gottschald....................... 287/87

Primary Examiner—Reinaldo P. Machado
Attorney, Agent, or Firm—John J. McGlew et al.

[57] ABSTRACT

A universal joint ball mounting comprises a pivot rod member having an opening therethrough and with a ball receiving socket secured on the rod member which extends through the opening and which provides a generally semi-spherical ball pivot surface on its interior for receiving a ball member of a universal joint. The rod member carries an outstanding lug disposed around a portion of the opening on each side thereof which define interior bearing surfaces which bear against the socket. The remaining area around the opening of the rod member defines a tongue which is engaged in a groove formation of the socket member. The socket member also advantageously includes a deformable upper part which may be bent into engagement over the top of the lugs.

4 Claims, 6 Drawing Figures

PATENTED JAN 22 1974 3,787,129

UNIVERSAL JOINT BALL MOUNTING CONSTRUCTION

BACKGROUND OF THE INVENTION

This invention relates, in general, to the construction of a universal joint ball mounting and, in particular, to a new and useful universal joint construction for windshield wipers which includes a pivotal or hinged rod having an opening into which a ball receiving socket member extends with an upstanding lug on a portion of the member defining a surrounding bearing surface for the socket which is engaged by a downturned portion of the socket member.

DESCRIPTION OF THE PRIOR ART

The invention deals particularly with the construction of a universal joint for connecting a hinged rod with a hinged member for drives used in windshield wiper systems for automobiles. Such universal joints are used, for example, for the connection of a hinged rod which is part of a windshield wiper linkage. In the known universal joint construction, a very large number of parts are required for fastening the ball cup on the hinged rod which is made of flat material. In addition, this type of fastening requires relatively long production times.

A universal joint of this type is known where a plastic ball cup is injected directly into a receptacle of the hinged rod. Such an injection method is very cumbersome, however, since the hinged flat rods have to be inserted first. In addition, there is also a great waste since it is not possible to maintain a continuous injection rhythm.

SUMMARY OF THE INVENTION

In accordance with the present invention, there is provided a universal joint which does not have the disadvantages of the prior art and which includes a socket member which is engaged through an opening on the rod member and which is provided with an annular groove adjacent its base for receiving an edge of the rod member which forms a tongue around the opening provided therein. A remaining portion of the rod member is provided with outstanding lugs or projections which define bearing receiving surfaces for the socket member around the opening and the socket member advantageously is secured over the lugs by deforming an upward portion thereof. The socket member has the usual opening at one end which is generally normal to the axis of the rod member and the opposite end may be enclosed by a dome-shaped cover. In an alternate construction, the socket member may also have a lateral extension with an outstanding rivet formation which is engaged into a receiving opening defined on the rod member and is subsequently flattened on its top so as to define a rivet-like interengagement with the rod member. In addition, the socket member may also have projecting portions adjacent its base which fit into defined cutouts or slots at the base of the outstanding lugs on the rod member to hold the socket member in position and prevent its turning. With the inventive construction, the individual socket members or ball cups can be produced in a continuous injection rhythm and be buttoned into the hinged rods.

An advantageous embodiment of the construction is one where the opening in the rod member is bounded on two opposite sides, for example, the sides transverse to the movement of the rod member with outstanding lugs which form interior bearing receiving surfaces, but the opposite sides are left free so that the edges of the rod which bound the opening on these sides engage into receiving grooves of the socket member. The hinged rod can thus be produced in a simple manner because the receptacle for the ball cup requires only one stamping and bending operation.

The construction may include additional deformable holding parts of either the rod member or the socket member or both. In the case where the socket member is provided with a bolt-type extension which engages into an opening of the rod member at a spaced location from the main socket receiving opening, the parts can form rivet-like joints by hot forming or by ultrasound welding, or they can be merely hammered over. The additional securement provides additional means for preventing the disengagement of the ball cup during operation and the necessity for such additional securement will depend upon use of the device.

Accordingly, it is an object of the invention to provide an improved universal joint ball mounting construction which includes a hinged rod member having an opening which is bounded around at least a portion thereof by an outstanding lug which forms an interior bearing surface which bears against a socket member which is secured in the opening and which includes a groove adjacent its base portion which precedes a portion of the rod member bounding the opening and which forms a tongue.

A further object of the invention is to provide an inexpensive universal joint ball mounting construction which includes a socket member which may be easily formed and buttoned into a receiving opening of a pivot rod and which includes receiving grooves on respective opposite sides which are engaged by tongue-like formations on respective opposite sides of the opening of the rod and which also engages around outstanding supporting lugs defined on the transverse sides of the opening.

A further object of the invention is to provide a universal joint construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 3:
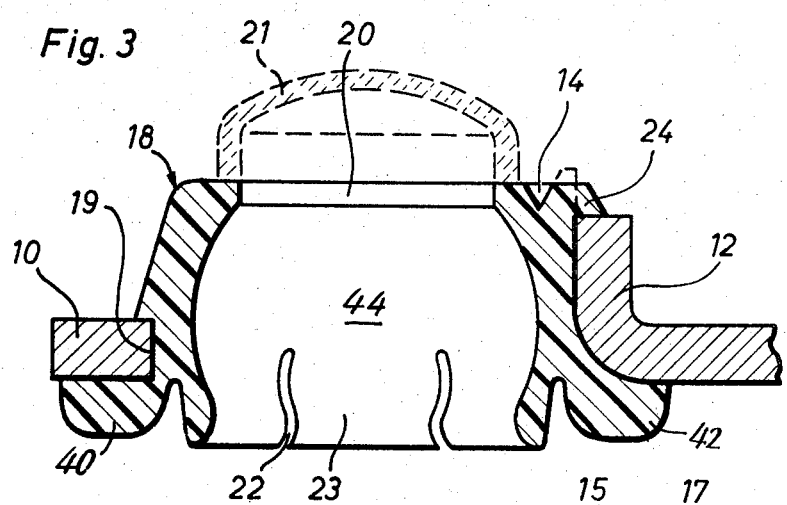
FIG. 3 is a section taken along the line III—III of FIG. 2.
Figure 1:
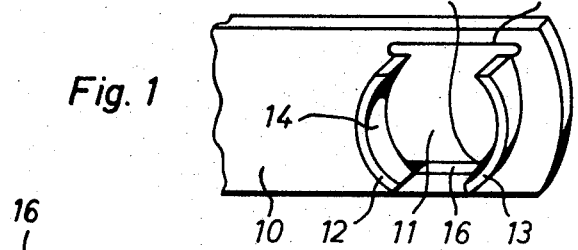
FIG. 1 is a partial top perspective view of a hinged rod providing a universal joint ball mounting constructed in accordance with the invention.
Figure 2:
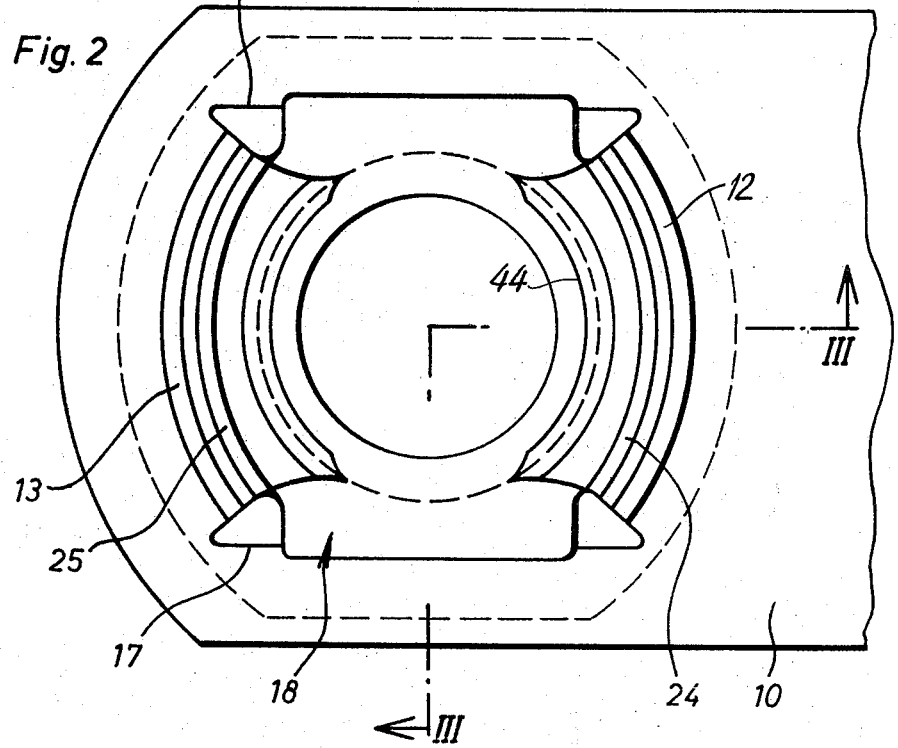
FIG. 2 is an enlarged partial top plan view of a universal joint ball mounting construction with the socket member united to the rod member.

Referring to the drawings, in particular, the invention embodied therein in FIGS. 1 – 3, comprises a hinged rod or pivot rod 10 having an opening 11 with relatively flat end edges on each side defining engagement tongues 16 and 17 and having outstanding projecting parts or lugs 12 and 13 which define interior bearing surfaces 14 and 15 which engage with a ball socket receiving member or ball cup generally designated 18. The bearing receiving surfaces 14 and 15 extend transverse to the direction of movement of the hinged rod 10 while the edges 16 and 17 which form tongues for the opening 11 extend in a direction of movement of the rod. The curvature of the bearing receiving surfaces 14 and 15 is complementary to the ball receiving socket member 18. The tongues 16 and 17 engage into receiving grooves 19 defined on the respective sides of the socket 18, at their lower portions or bases and the socket member has widenings 40 and 42 which engage beneath the hinged rod 10.

The socket 18 includes an interior, generally semi-spherical surface 44 which provides a sliding bearing surface for a ball pin (not shown) of the universal joint. The socket 18 includes a skirt portion with lug formations 23 which are separated by slots 22 which extend upwardly from the base of the socket. The semi-resilient lugs 23 permit access of the ball member of the joint through the bottom of the socket 18 and the top 20 of the socket is closed, for example, by a cover or dome 21. The resilient skirt with the lugs 23 prevent the penetration of water and dust into the joint. Socket 18 is advantageously made of a plastic material by injection molding and the hinged rod 10 is advantageously produced by stamping and bending.

After the socket 18 is inserted into the opening 11 of the rod 10, projecting portions or fins 24 and 25 which are co-extensive with the projections 12 and 13 are bent over by hot forming or ultrasound welding to engage against the top of the projections so that a very good securement is effected.

Figure 4:
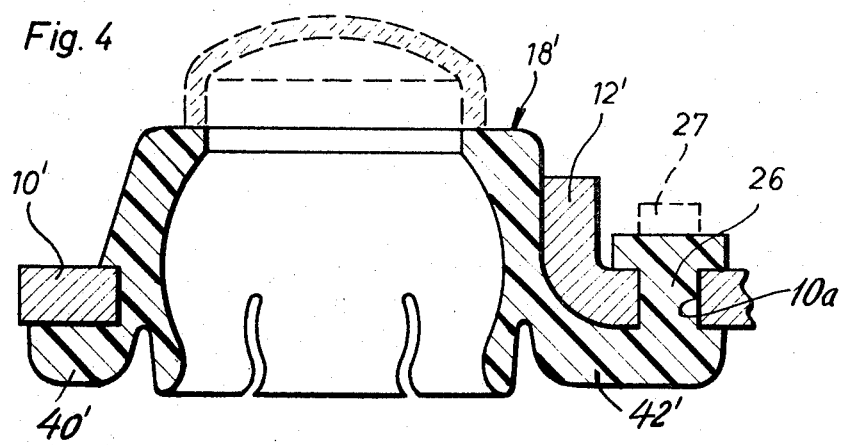
FIG. 4 is a view similar to FIG. 3 of another embodiment of the invention.
Figure 5:
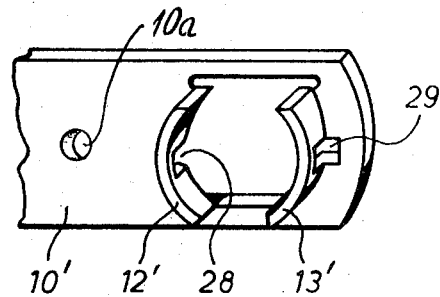
FIG. 5 is a view similar to FIG. 1 of the embodiment of the invention shown in FIG. 4.
Figure 6:
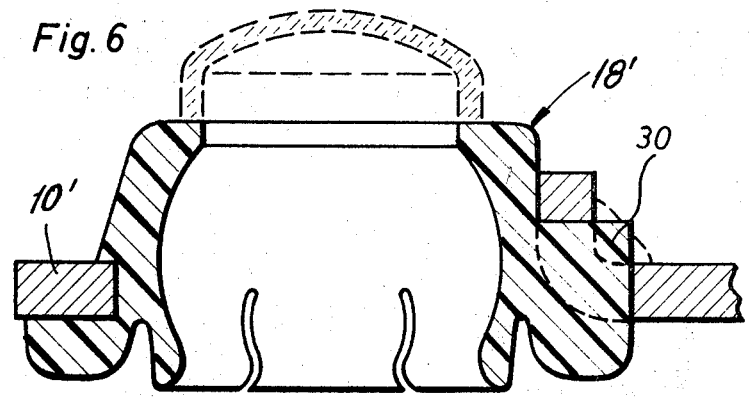
FIG. 6 is a longitudinal sectional view taken through the end slots of the receiving rod shown in FIG. 5.

In the embodiment of the invention shown in FIGS. 4 – 6, similar parts are similarly designated but with primes. As best seen in FIG. 4, the ball cup or socket 18' includes a lower portion 42' with an upstanding part or projection 26 which engages upwardly through an opening 10a of the rod member 10' and is deformed from the dotted line position shown in FIG. 4 at 27 into the rivet-formation of the projection 26 shown in solid lines. The rivet-type joint is effected by hot forming of the extension end 27 to up-set it to the solid line showing FIG. 4.

The embodiment of FIGS. 4 – 6 also includes locking lugs 30 which are formed on respective opposite sides of the socket 18' and which engage into receiving slots 28 and 29 which are defined in the rod member 10'. The lugs 30 are also hot-formed and provide rivet-type engagement elements as shown in FIG. 6. This additional measure improves the degree of securement of the socket member 18' in the hinged rod 10'.

While specific embodiments of the invention have been shown and described in detail to illustrate the application of the inventive principles, it will be understood that the invention may be embodied otherwise without departing from such principles.

What is claimed is:

1. A universal joint ball mounting construction, comprising a pivot rod member having an opening therethrough, a ball receiving socket secured to said rod member and having an interior generally semi-spherical ball pivot surface with a ball pin receiving opening at one end having an axis generally normal to the axis of the rod member, said socket having an exterior surface extending around a portion of its periphery with a tongue receiving groove, a lug extending outwardly from said rod member at respective opposite sides of said socket and disposed around and in contact with at least portions of said socket, the remaining portion of the rod member bordering the opening defining an engagement tongue engaged in said tongue receiving groove of said socket, and a deformed part of the exterior of said socket engaged over said lugs, said lugs being arranged at ends which are transverse to the direction of movement of the rod member, said rod member having at least one slot between said lugs, said socket having a holding projection engaged into said slot.

2. A universal joint ball mounting construction, comprising a pivot rod member having an opening therethrough, a ball receiving socket secured to said rod member and having an interior generally semi-spherical ball pivot surface with a ball pin receiving opening at one end having an axis generally normal to the axis of the rod member, said socket having an exterior surface extending around a portion of its periphery with a tongue receiving groove, at least one lug extending outwardly from said rod member and disposed around at least a portion of the opening therethrough, the remaining portion of the rod member surrounding the opening defining an engagement tongue engaged in said tongue receiving groove of said socket, and a deformed part of the exterior of said socket engaged over said lug, said socket including a skirt portion on the side of said rod member opposite to said projecting lugs, said rod member having a second opening, said skirt opening having an upstanding rivet-forming projection engaged in the second opening and being deformed into engagement with said rod member.

3. A universal joint ball mounting construction, comprising a pivot rod member having an opening therethrough, a ball receiving socket secured to said rod member and having an interior generally semi-spherical ball pivot surface with a ball pin receiving opening at one end having an axis generally normal to the axis of the rod member, said socket having an exterior surface extending around a portion of its periphery with a tongue receiving groove, at least one lug extending outwardly from said rod member and disposed around at least a portion of the opening therethrough, the remaining portion of the rod member surrounding the opening defining an engagement tongue engaged in said tongue receiving groove of said socket, and a deformed part of the exterior of said socket engaged over said lug, wherein there are at least two lugs arranged on respective ends of said socket, said socket having upstanding parts on each end substantially co-extensive with said lugs and engaged over said lugs, and including a slot formed in each of said lugs, said socket having a projection on each side engaged into the slot of said lugs and engaged over said member.

4. Universal joint for connecting a hinged rod with a hinged member for drives used in vehicles, particularly for windshield wiper systems in motor vehicles, consisting of a ball cup secured on the hinged rod and of a spherical part secured on the hinged member, characterized in that the hinged rod has an opening with sides extending transverse to the direction if its movement with projecting bearing surfaces extending perpendicularly to the axis of said hinged rod, and that said ball cup includes a groove provided on its outer surface, said hinged rod being engaged in said groove, said projecting bearing surfaces being lugs which are bent out of the hinged rod in the opening and which have a rounding which is adapted to the rounding of the outer surface of the ball cup, said rod having an opening at the points where said bearing surfaces are bent off, and said ball cup having an outer surface projection on respective sides which engage into the openings.

* * * * *